June 4, 1929. W. N. GOODWIN, JR., ET AL 1,716,227
METHOD OF TREATING VACUUM TUBES OF THE AUDION TYPE
Filed March 14, 1925 2 Sheets-Sheet 1

Inventors:
William N. Goodwin, Jr.
Charles H. Bartlett
By Byrnes, Townsend & Brickenstein
Attorneys.

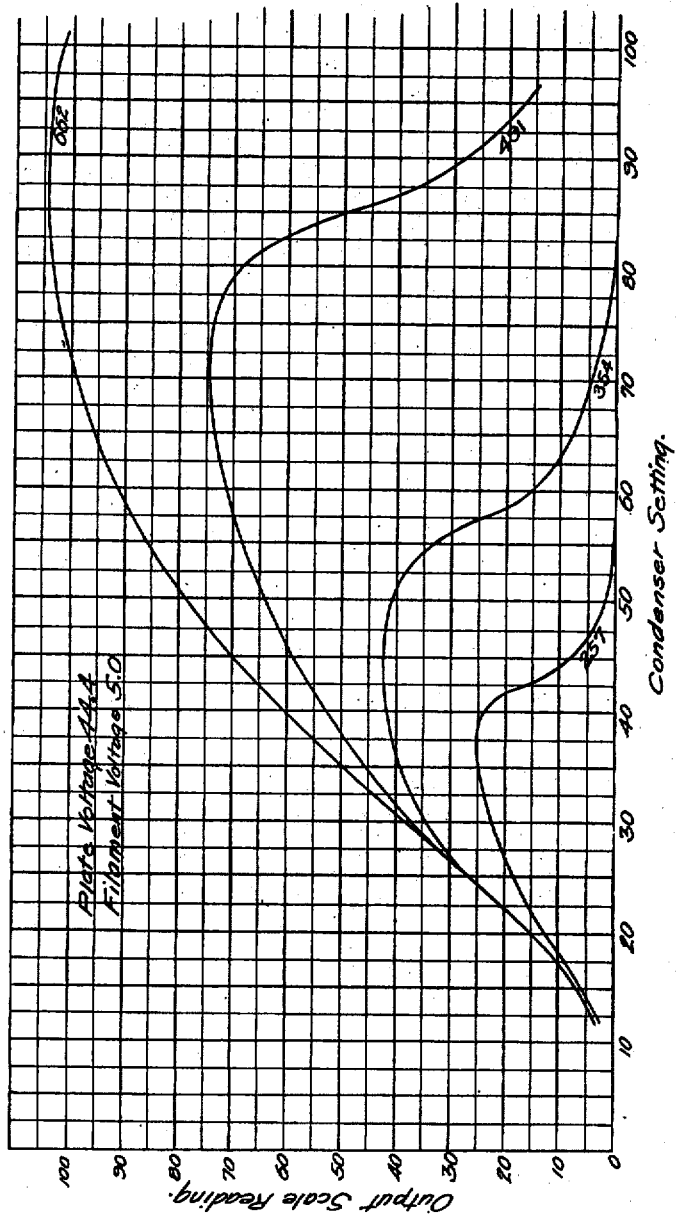

Patented June 4, 1929.

1,716,227

UNITED STATES PATENT OFFICE.

WILLIAM NELSON GOODWIN, JR., AND CHARLES HAROLD BARTLETT, OF NEWARK, NEW JERSEY, ASSIGNORS TO WESTON ELECTRICAL INSTRUMENT CORPORATION, OF NEWARK, NEW JERSEY, A CORPORATION OF NEW JERSEY.

METHOD OF TESTING VACUUM TUBES OF THE AUDION TYPE.

Application filed March 14, 1925. Serial No. 15,522.

Our invention relates to a method of testing vacuum tubes of the audion type as used in radio receivers and for other similar purposes.

Various forms of testing sets have been developed, none of which, to our knowledge, has proved satisfactory.

Our invention is more particularly intended as an improvement upon a more recent method of testing tubes which is based on the assumption that evidence of the ability of a tube to produce an oscillating current was a reliable criterion of its amplifying quality.

To more fully explain the invention, the principle upon which it is based, its mode of operation and its advantages, reference is made to the accompanying drawings in which:

Fig. 2 is a curve diagram graphically indicating the results of tests conducted in accordance with the invention on four tubes.

We have found that if provisions are made for varying the frequency of an oscillating circuit through a wide range, and if the oscillating circuit is properly designed, a gradual change in the frequency will be followed by a gradual change in the magnitude of the oscillating current. Thus, if a variable condenser is used for varying the frequency of an oscillating circuit, and if the condenser is varied, for instance from its minimum value toward its maximum value, the oscillating current will gradually increase to a maximum value and then decrease, it being assumed, of course, as before that the circuit is properly designed. We have also found that this maximum value is a measure of the quality of a tube as an amplifier as determined on tests of many tubes compared with tests when used in actual radio receiving sets, and is approximately proportional to the mutual conductance of the tube measured at audio frequencies, which has usually been considered as a measure of the quality of a tube. We have further found that this maximum value of current occurs at a condenser setting which is also a measure of the quality of the tube used in receiving sets as determined by tests, and approximately proportional to the mutual conductance. In other words, the better the tube, the greater the value of the oscillating current and the higher the condenser setting or corresponding wave lengths.

The relationship between mutual conductance and the frequency at which maximum current occurs is not linear since this frequency decreases as the mutual conductance increases and at a greater rate. The relationship is approximately definite but bears no simple law. That such a relationship does exist has been determined by our experiments, rather than by a theoretical deduction.

Figure 1:
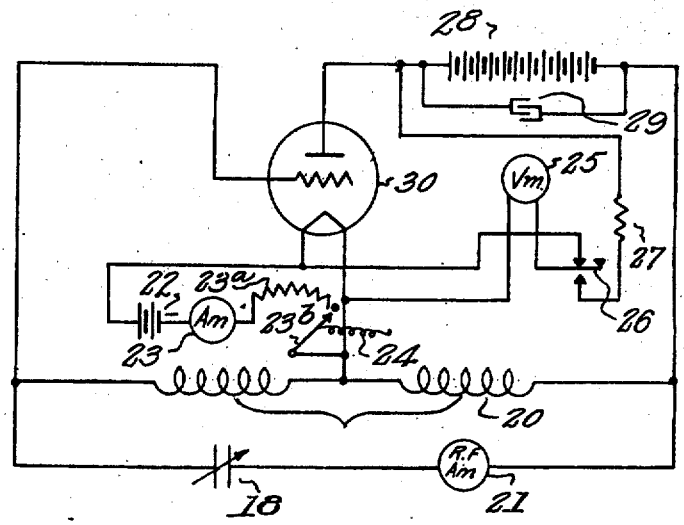
Fig. 1 is a diagrammatic representation of an arrangement embodying the invention.

While the invention may be embodied in various forms, as will be readily understood, Fig. 1 represents what we, at present, consider as a preferred embodiment on account of its simplicity of adjustment and for the reason that it oscillates very readily. The circuit, which is well known as the Hartley circuit, includes inductance coils 19 and 20 which together with the variable condenser 18 and radio frequency current indicating instrument 21 form the resonant circuit. As is well known, these coils 19 and 20 need not be inductively coupled, but we found that varying the coupling or mutual inductance between these coils furnishes an excellent means for adjusting the value of the oscillating current for the proper scale deflection of the indicating instrument in the manufacture of the set.

The circuit of the "A" battery 22 preferably includes a filament ammeter 23 together with a filament rheostat including the resistance 23$^a$ and the contact arm 23$^b$ and a voltmeter 25. When the rheostat is not in use, the contact arm is returned to open position at the high resistance end of the resistance 23$^a$ by a spring 24.

The voltmeter 25 is connected into the circuit so that by means of a key 26 it may be used for measuring the plate voltage as well as the voltage across the filament, the multiplying resistor 27 being placed between the key 26 and the plate.

Across the "B" battery 28 is connected a by-pass condenser 29.

The tube 30 to be tested is placed into the circuit and the frequency is gradually varied by varying the condenser 18 from its minimum value toward its maximum value and the maximum scale deflection of the radio frequency ammeter 21 is noted.

Fig. 2 graphically represents the variations in magnitude of the oscillating currents observed during tests made on four tubes having widely differing mutual conductances, the actual values of which as measured on a bridge were 662, 491, 354 and 257 micro-ohms respectively. The values of the instrument indication, for each tube, which are actually proportional to the square of the oscillating currents, are plotted against condenser settings, and it will be observed that for each curve the maximum oscillating current and the condenser setting for the maximum oscillating current are substantially proportional to each other and to the mutual conductance, the value $g$ of which is indicated for each curve.

Figure 3:
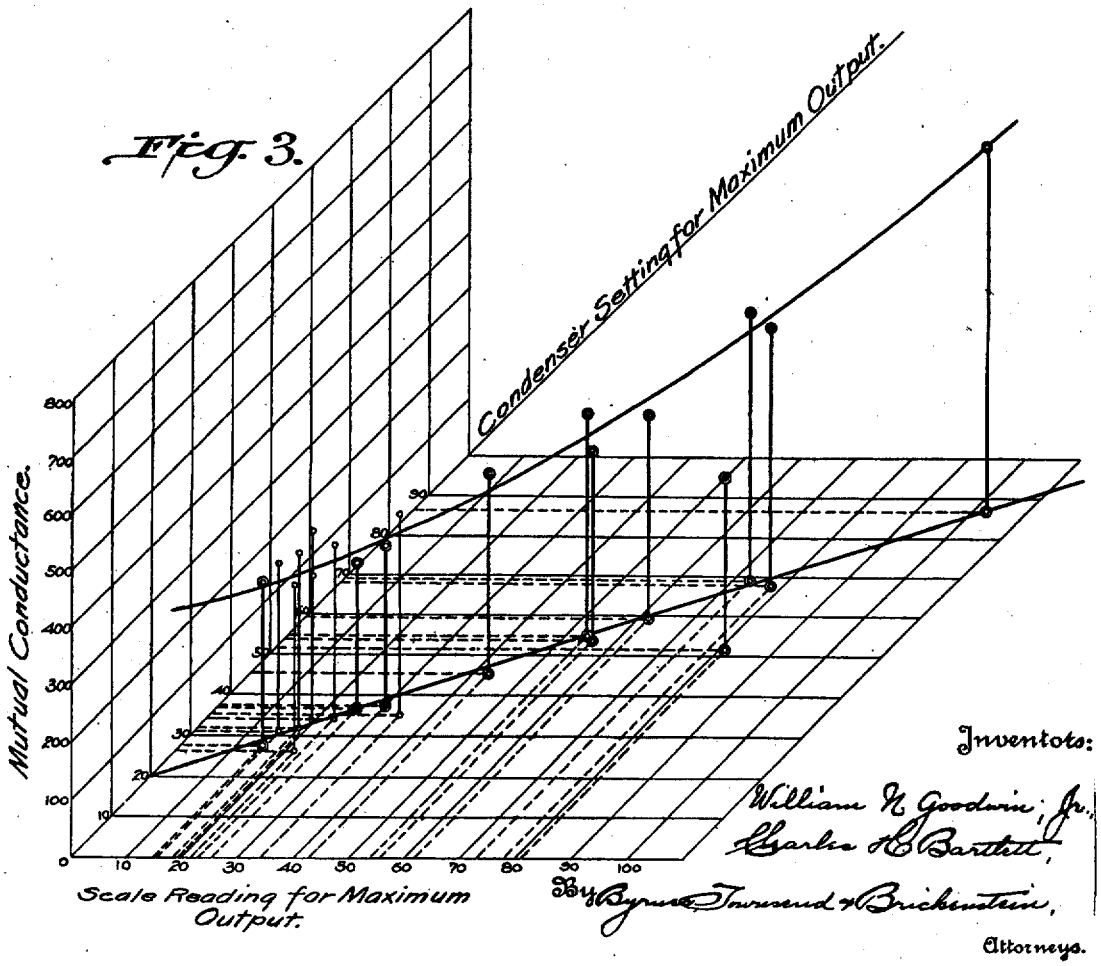
Fig. 3 is a three dimensional diagram showing graphically certain relations as the average for a large number of tubes.

We have made tests on a large number of tubes of different makes, old, new and at various times during the life of the tubes. Fig. 3 is a three dimensional diagram giving the curve in space which shows the relation between mutual conductance, maximum oscillating current, and condenser setting as an average of all the tube tests. A few of the values obtained are shown as dots on or near the curve. The deviations are partly due to experimental errors, but mostly due to the fact that we found that the mutual conductance as measured at audio frequencies is not a sure criterion of the quality of a tube when actually used in circuits at radio frequencies, on account of the widely different conditions obtaining under the different frequencies.

By the method described, it is thus possible to differentiate not only between an excellent tube and an absolutely worthless tube, but also to finely grade tubes with reference to a definite standard of excellence, so that any convenient number of classes may be established informing the purchaser exactly of the quality of the tube and its functional value in a receiving set. In addition, such classification enables purchasers to match tubes by selecting such tubes as have the same or nearly the same current values and condenser settings. A purchaser is no longer bound to take the risk as to how the tube might turn out in his receiving set, but he can use his own judgment.

Among the various combinations possible within the scope of the invention, a tester having the following constants may be considered as fairly representative:

Maximum capacity of condenser = 0.0015 microfarads.

Number of turns on the plate inductance = 15.

Number of turns on the grid inductance = 15.

Diameter of inductance coils = 3".

The earliest form of practical tube tester was one which consisted simply of the proper arrangement of electrical measuring instruments to carry out the well known classical method of determining the characteristic curves of the tube.

We do not limit ourselves to a variable condenser as a means for varying the wave length or frequency of the oscillating current. Any means which will accomplish this result may be used, as for instance using a fixed condenser instead of the variable 18 in Fig. 1 and have inductances 19 and 20 variable, or in general by using a variable inductance with a fixed condenser.

In contradistinction to the prior art, our testing device, as the result of many tests, has been found to offer a more sure means for determining the amplifying quality of tubes as used under practical conditions, while the time for making the tests is reduced to a practical minimum.

We claim:

1. The method of determining the relative operating value of a vacuum tube of the type which has an approximately definite relationship between the mutual conductance of the tubes and the frequency at which the tubes will generate maximum currents in an oscillatory circuit, which comprises causing the tube to produce an oscillating current in an oscillatory circuit, varying the frequency of the oscillating current by adjusting an element of said circuit, and comparing the adjustment which corresponds to maximum current flow with a predetermined standard, which standard is the adjustment that would give maximum current flow if a standard tube were substituted in the oscillatory circuit.

2. The method of determining the relative operating value of a vacuum tube of the type which has an approximately definite relationship between the mutual conductance of the tubes and the frequency at which the tubes will generate maximum currents in an oscillatory circuit, which comprises causing the tube to produce an oscillating current in an oscillatory circuit, varying the frequency of the oscillating current by an adjustable element of said circuit to a point of maximum current flow, and comparing the magnitude of the said maximum current with a predetermined standard, which standard is the magnitude of the maximum current flow which could be established if a standard tube were substituted in the oscillatory circuit.

3. The method of comparing the operating qualities of vacuum tubes of the audion type which comprises causing one of said tubes to produce oscillatory current in a circuit including a variable reactor, varying the magnitude of the reactor to secure maximum current flow in said circuit, replacing said first tube by a second tube and repeating the step of adjusting the reactor to secure maximum current flow, and comparing the tubes on the basis of the adjustments of the reactor which corresponded to the maximum flow of current for the respective tubes.

4. The method of comparing vacuum tubes of the audion type which comprises causing one of said tubes to produce oscillatory current in a circuit including a variable reactor, varying the magnitude of the reactor to secure maximum current flow in said circuit, replacing said first tube by a second tube and repeating the step of adjusting the reactor to secure maximum current flow, and comparing the tubes on the basis of the magnitudes of the maximum currents established by the respective tubes.

In testimony whereof, we affix our signatures.

WILLIAM NELSON GOODWIN, Jr.
CHARLES HAROLD BARTLETT.

CERTIFICATE OF CORRECTION.

Patent No. 1,716,227.  Granted June 4, 1929, to

WILLIAM NELSON GOODWIN, JR., ET AL.

It is hereby certified that error appears in the printed specification of the above numbered patent requiring correction as follows: In the heading to the drawings, line 2, title of invention for the word "Treating" read "Testing"; and that the said Letters Patent should be read with this correction therein that the same may conform to the record of the case in the Patent Office.

Signed and sealed this 6th day of August, A. D. 1929.

(Seal)

M. J. Moore,
Acting Commissioner of Patents.

rent flow which could be established if a standard tube were substituted in the oscillatory circuit.

3. The method of comparing the operating qualities of vacuum tubes of the audion type which comprises causing one of said tubes to produce oscillatory current in a circuit including a variable reactor, varying the magnitude of the reactor to secure maximum current flow in said circuit, replacing said first tube by a second tube and repeating the step of adjusting the reactor to secure maximum current flow, and comparing the tubes on the basis of the adjustments of the reactor which corresponded to the maximum flow of current for the respective tubes.

4. The method of comparing vacuum tubes of the audion type which comprises causing one of said tubes to produce oscillatory current in a circuit including a variable reactor, varying the magnitude of the reactor to secure maximum current flow in said circuit, replacing said first tube by a second tube and repeating the step of adjusting the reactor to secure maximum current flow, and comparing the tubes on the basis of the magnitudes of the maximum currents established by the respective tubes.

In testimony whereof, we affix our signatures.

WILLIAM NELSON GOODWIN, Jr.
CHARLES HAROLD BARTLETT.

CERTIFICATE OF CORRECTION.

Patent No. 1,716,227.           Granted June 4, 1929, to

WILLIAM NELSON GOODWIN, JR., ET AL.

It is hereby certified that error appears in the printed specification of the above numbered patent requiring correction as follows: In the heading to the drawings, line 2, title of invention for the word "Treating" read "Testing"; and that the said Letters Patent should be read with this correction therein that the same may conform to the record of the case in the Patent Office.

Signed and sealed this 6th day of August, A. D. 1929.

(Seal)

M. J. Moore,
Acting Commissioner of Patents.

CERTIFICATE OF CORRECTION.

Patent No. 1,716,227.                                      Granted June 4, 1929, to

WILLIAM NELSON GOODWIN, JR., ET AL.

It is hereby certified that error appears in the printed specification of the above numbered patent requiring correction as follows: Page 2, line 19, for the compound word "micro-ohms" read "micro-mhos". In the drawings, sheet 1, Fig. 1, the reference numeral "19" should appear at the left side of the view showing the inductance coil at the left end of the brace; and that the said Letters Patent should be read with these corrections therein that the same may conform to the record of the case in the Patent Office.

Signed and sealed this 1st day of October, A. D. 1929.

(Seal)                                                                      M. J. Moore,
                                                                             Acting Commissioner of Patents.